(12) United States Patent
Horii et al.

(10) Patent No.: US 6,678,342 B1
(45) Date of Patent: Jan. 13, 2004

(54) ABSOLUTE-PHASING SYNCHRONIZATION CAPTURING CIRCUIT

(75) Inventors: Akihiro Horii, Zama (JP); Kenichi Shiraishi, Yokohama (JP)

(73) Assignee: Kabushiki Kaisha Kenwood, Tokyo (JP)

(*) Notice: Subject to any disclaimer, the term of this patent is extended or adjusted under 35 U.S.C. 154(b) by 0 days.

(21) Appl. No.: 09/446,460

(22) PCT Filed: Jun. 29, 1998

(86) PCT No.: PCT/JP98/02897
§ 371 (c)(1),
(2), (4) Date: Dec. 22, 1999

(87) PCT Pub. No.: WO99/00955
PCT Pub. Date: Jan. 7, 1999

(30) Foreign Application Priority Data

Jun. 30, 1997 (JP) .............................................. 9-187175
Jun. 30, 1997 (JP) .............................................. 9-187176
Jun. 30, 1997 (JP) .............................................. 9-187177

(51) Int. Cl.⁷ .................................................. H04L 7/04
(52) U.S. Cl. ........................ 375/362; 375/354; 375/371
(58) Field of Search ................................. 375/329, 354; 370/350; 329/304

(56) References Cited

U.S. PATENT DOCUMENTS 5,555,247 A * 9/1996 Matsuoka et al. .......... 370/350
5,566,184 A   10/1996 Ooi

FOREIGN PATENT DOCUMENTS

| JP | 6-216557   | 9/1987  |
| JP | 62-216557  | 9/1987  |
| JP | 3-219745   | 9/1991  |
| JP | 03-219745  | 9/1991  |
| JP | 4-334238   | 11/1992 |
| JP | 04-334238  | 11/1992 |
| JP | 04-344734  | 12/1992 |
| JP | 06-120995  | 4/1994  |
| JP | 6-120995   | 4/1994  |
| JP | 06-205055  | 7/1994  |
| JP | 6-276239   | 9/1994  |
| JP | 09-186730  | 7/1997  |

* cited by examiner

Primary Examiner—Stephen Chin
Assistant Examiner—Curtis Odom
(74) Attorney, Agent, or Firm—Eric J. Robinson; Robinson Intellectual Property Law Office, P.C.

(57) ABSTRACT

A small-scale absolute-phasing synchronization capturing circuit for absolute phasing of a received signal by selectively transmitting a baseband signal demodulated through a demodulator (1), a baseband signal subjected to phase rotation through a remapper (11), a baseband signal output from a first inverting means, a baseband signal output from a second inverting means based on the phase angle of the received signal relative to the phase rotation of the transmission signal. The most significant bit in the demodulated baseband signal and the most significant bit in the baseband signal subjected to phase rotation through the remapper (11) are extracted and a frame synchronization signal is captured according to the extracted significant bit.

5 Claims, 21 Drawing Sheets

| θ | RT (3) | I' | Q' |
|---|---|---|---|
| 0° | (0, 0, 0) | I | Q |
| 90° | (0, 1, 0) | Q | -I |
| 180° | (1, 0, 0) | -I | -Q |
| 270° | (1, 1, 0) | -Q | I |

(b)

| θ | RT (3) | I' | Q' |
|---|---|---|---|
| 45° | (0, 0, 1) | i | q |
| 135° | (0, 1, 1) | q | -i |
| 225° | (1, 0, 1) | -i | -q |
| 315° | (1, 1, 1) | -q | i |

FIG. 3

| θ | BPSK DEMAPPING OUTPUT |
|---|---|
| 0° | MSB OF I |
| 45° | MSB OF i |
| 90° | MSB OF Q |
| 135° | MSB OF q |
| 180° | MSB OF INVERTED I |
| 225° | MSB OF INVERTED i |
| 270° | MSB OF INVERTED Q |
| 315° | MSB OF INVERTED q |

FIG. 6

| CAPTURED FRAME SYNCHRONIZATION SIGNAL | LOGICAL OPERATION EQUATION |
|---|---|
| SYNCPAT | FFH0×FRH0×RFH0×RRH0 |
| nSYNCPAT | FFH0×FRH0×RFL0×RRL0 |
| SYNCNPAT | FFL0×FRL0×RFL0×RRL0 |
| nSYNCNPAT | FFL0×FRL0×RFH0×RRH0 |

FIG. 7

| SYNCHRONISM DETECTION CIRCUIT OUTPUT | LOGICAL OPERATION EQUATION |
|---|---|
| SYNA 0 | (FFH0×FRH0×RFH0×RRH0) + (FFL0×FRL0×RFL0×RRL0) |
| SYNB 0 | (FFH0×FRH0×RFL0×RRL0) + (FFL0×FRL0×RFH0×RRH0) |

FIG. 8
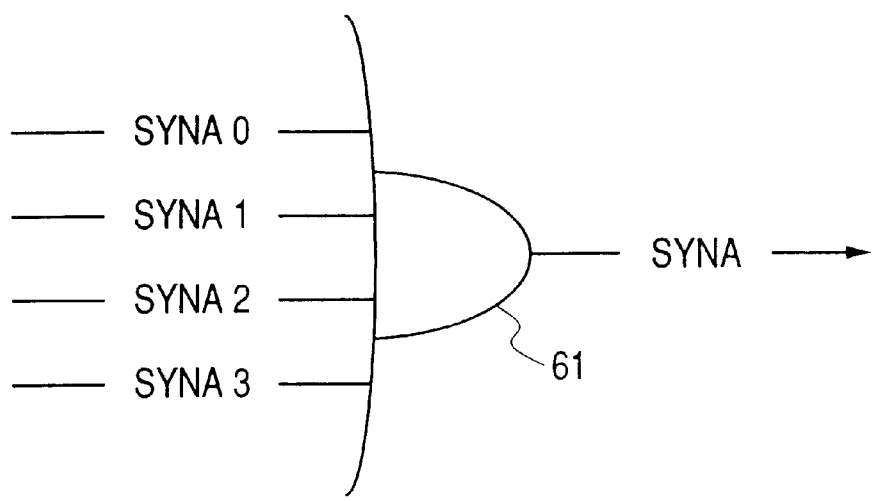
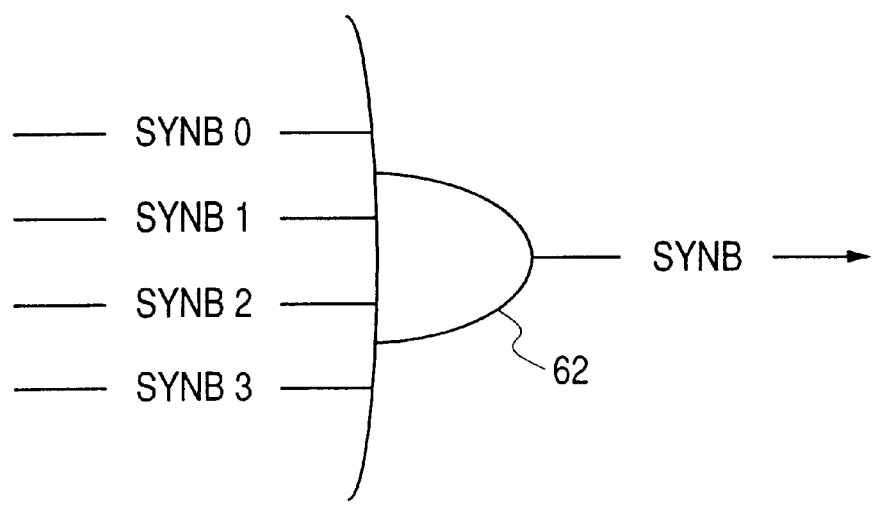

| θ | RT (3) | I' | Q' |
|---|---|---|---|
| 45° | "001" | -q | i |
| 135° | "011" | i | q |
| 225° | "101" | q | -i |
| 315° | "111" | -i | -q |

(b)

| θ | RT (3) | I' | Q' |
|---|---|---|---|
| 45° | "001" | -i | -q |
| 135° | "011" | -q | i |
| 225° | "101" | i | q |
| 315° | "111" | q | -i |

(c)

| θ | RT (3) | I' | Q' |
|---|---|---|---|
| 45° | "001" | q | -i |
| 135° | "011" | -i | -q |
| 225° | "101" | -q | i |
| 315° | "111" | i | q |

| θ | BPSK DEMAPPING OUTPUT |
|---|---|
| 0° | MSB OF I |
| 45° | MSB OF INVERTED q |
| 90° | MSB OF Q |
| 135° | MSB OF i |
| 180° | MSB OF INVERTED I |
| 225° | MSB OF q |
| 270° | MSB OF INVERTED Q |
| 315° | MSB OF INVERTED i |

(b)

| θ | BPSK DEMAPPING OUTPUT |
|---|---|
| 0° | MSB OF I |
| 45° | MSB OF INVERTED i |
| 90° | MSB OF Q |
| 135° | MSB OF INVERTED q |
| 180° | MSB OF INVERTED I |
| 225° | MSB OF i |
| 270° | MSB OF INVERTED Q |
| 315° | MSB OF q |

(c)

| θ | BPSK DEMAPPING OUTPUT |
|---|---|
| 0° | MSB OF I |
| 45° | MSB OF q |
| 90° | MSB OF Q |
| 135° | MSB OF INVERTED i |
| 180° | MSB OF INVERTED I |
| 225° | MSB OF INVERTED q |
| 270° | MSB OF INVERTED Q |
| 315° | MSB OF i |

FIG. 15
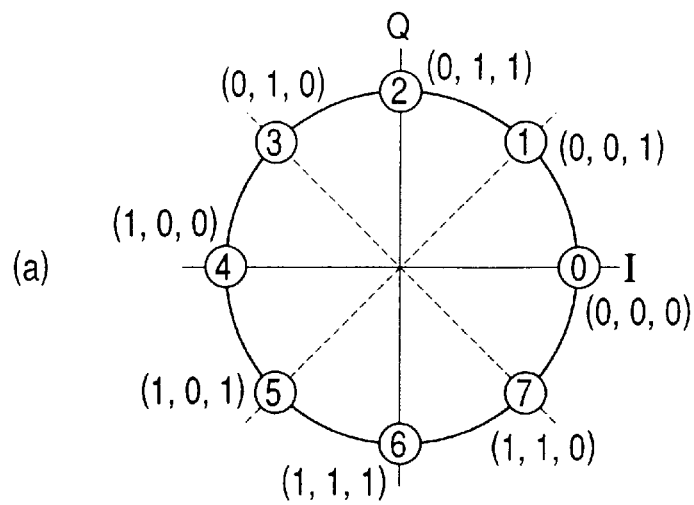
(a)
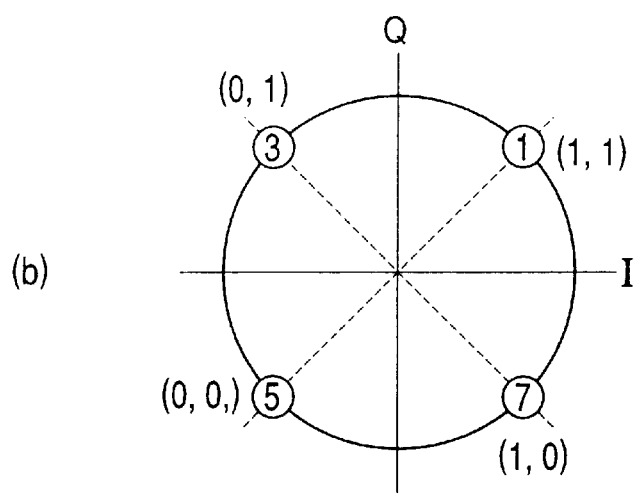
(b)
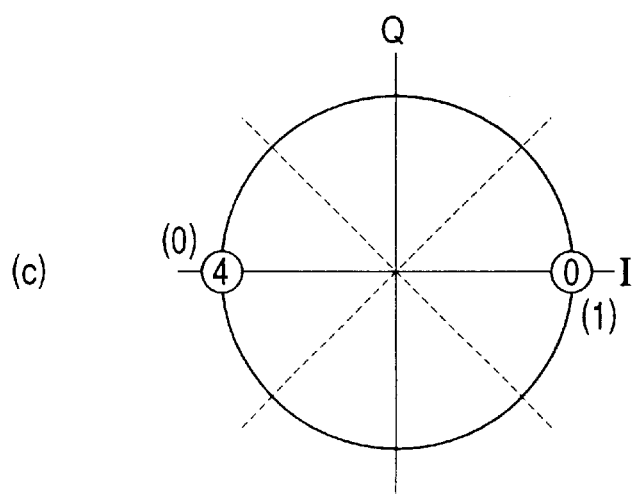
(c)

FIG. 16
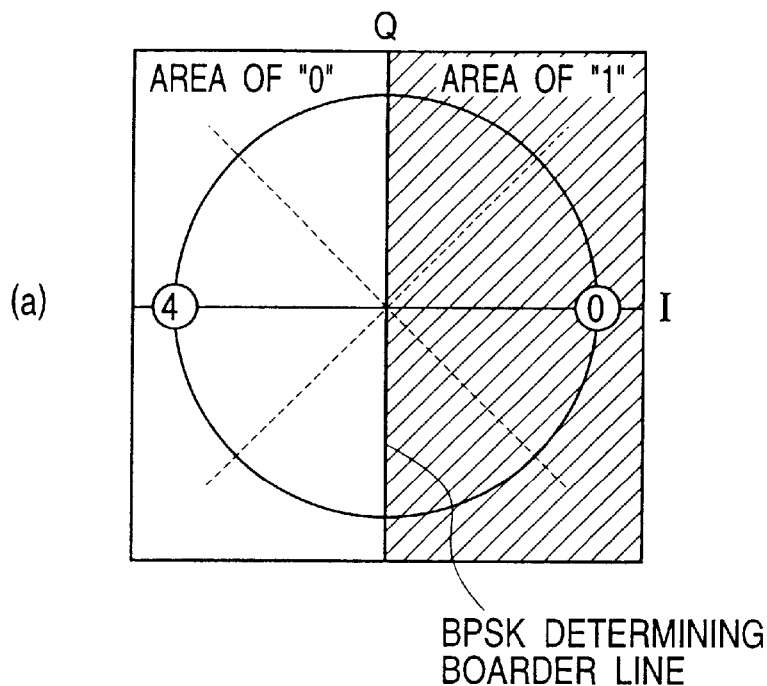
(a)
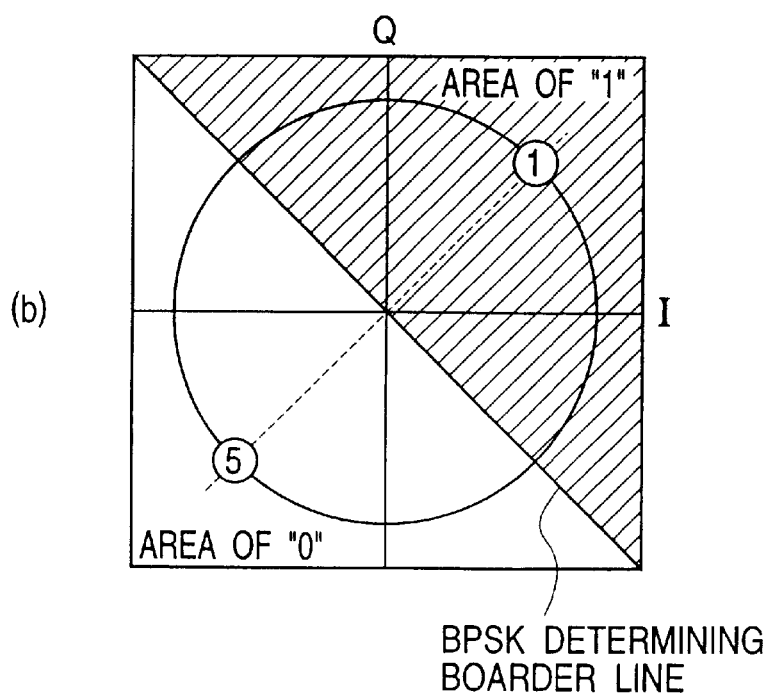
(b)

(PRIOR ART)

FIG. 19
(a) 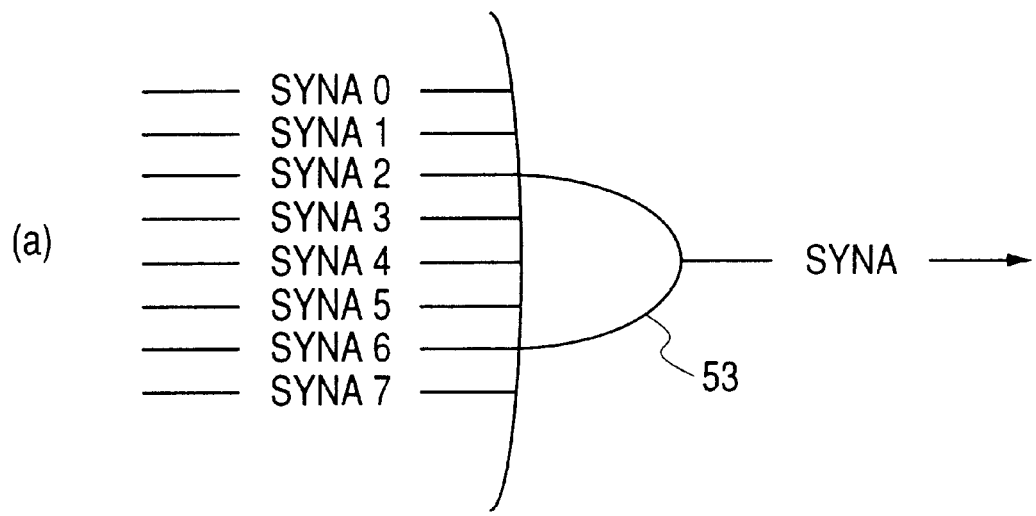
(b) 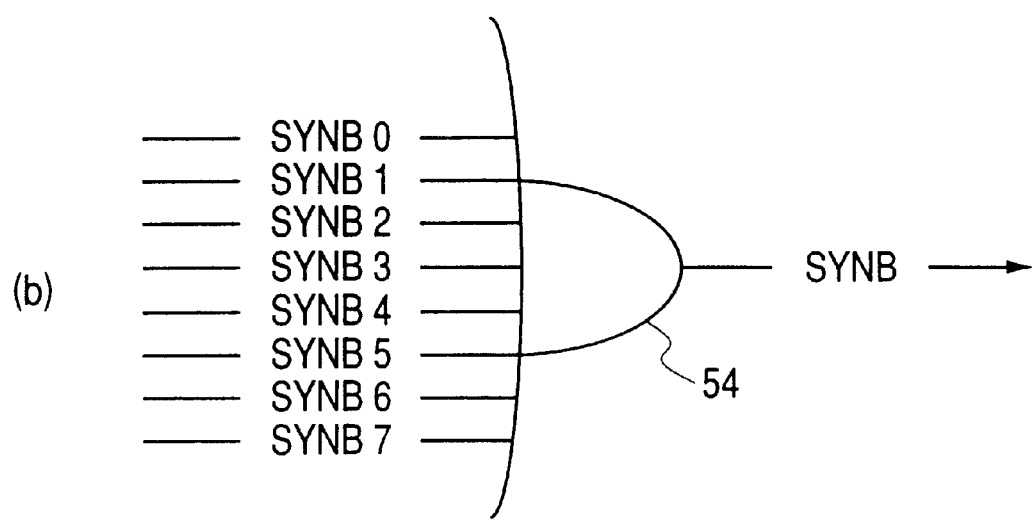
(PRIOR ART)

FIG. 20
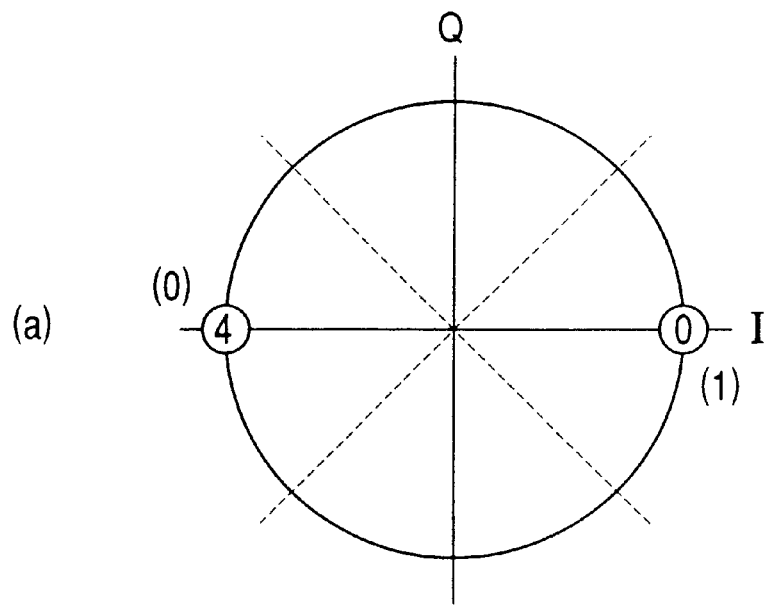
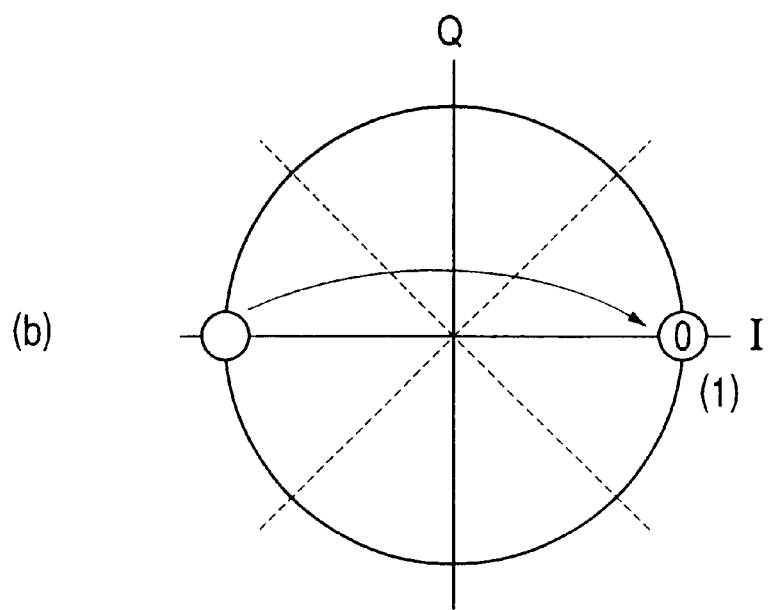

ABSOLUTE-PHASING SYNCHRONIZATION CAPTURING CIRCUIT

TECHNICAL FIELD

The present invention relates to an absolute-phasing synchronization capturing circuit, and more particularly to an absolute-phasing synchronization capturing circuit for absolute-phasing a received signal phase angle to make it coincide with a transmission signal phase angle, the circuit being used with a receiver which receives a digital signal modulated by different modulation methods having different necessary C/N.

BACKGROUND OF THE INVENTION

In a broadcasting receiver which receives a modulated digital signal transmitted by a hierarchical transmission method with a time sequential combination of different modulation methods having different necessary C/N, such as 8PSK modulation, QPSK modulation and BPSK modulation, to be repeated for each frame, an absolute-phasing synchronization capturing circuit absolute-phases a received signal phase angle to make it coincide with a transmission signal phase angle, by capturing a frame synchronization signal from demodulated baseband signals (hereinafter also called a symbol stream), by calculating a current received signal phase rotation angle from the signal point arrangement of the captured frame synchronization signal, and by rotating the demodulated baseband signals in a reverse phase direction in accordance with the calculated received signal phase rotation angle.

A conventional absolute-phasing synchronization capturing circuit has, as shown in FIG. 14, a demodulation circuit 1, a frame synchronism detection block 2, a frame synchronization signal generator 6, a remapper 7 made of a ROM, and a received signal phase detection block 8. The frame synchronism detection block 2 has a BPSK demapper 3, synchronism detection circuits 40 to 47, and a frame synchronization circuit 5. The received signal phase detection block 8 has delay circuits 81 and 82, a 0°/180° phase rotation circuit 83, accumulating/adding/averaging circuits 85 and 86, and a received signal phase determining circuit 87.

The conventional absolute-phasing synchronization capturing circuit shown in FIG. 14 frequency-converts a received digital modulated signal into a signal having a predetermined intermediate frequency which is supplied to the demodulation circuit 1 to demodulate the intermediate frequency signal. The demodulation circuit 1 outputs demodulated baseband signals, e.g., baseband signals I(8) and Q(8) with the quantization bit number of 8 (numerals in the parentheses indicate the number of bits which are sometimes omitted in the following and simply written as I and Q).

The baseband signals I(8) and Q(8) are input to, for example, the BPSK demapper 3 of the frame synchronism detection block 2 in order to capture the BPSK modulated frame synchronization signal. The BPSK demapper 3 outputs a BPSK demapped bit stream B0. The BPSK demapper 3 is made of, for example, a ROM.

Mapping for each modulation method on the transmission side will be described with reference to FIG. 15. FIG. 15(a) shows a signal point arrangement for 8PSK modulation. 8PSK modulation can transmit a three-bit digital signal (a, b, c) by one symbol. There are eight combinations of bits constituting one symbol, i.e., (0, 0, 0), (0, 0, 1), ..., (1, 1, 1). These 3-bit digital signals are converted into signal point arrangements 0 to 7 on a transmission side I-Q vector plane shown in FIG. 15(a). This conversion is called 8PSK mapping.

In the example shown in FIG. 15(a), a bit train (0, 0, 0) is converted into the signal point arrangement "0", a bit train (0, 0, 1) is converted into the signal point arrangement "1", a bit train (0, 1, 1) is converted into the signal point arrangement "2", a bit train (0, 1, 0) is converted into the signal point arrangement "3", a bit train (1, 0, 0) is converted into the signal point arrangement "4", a bit train (1, 0, 1) is converted into the signal point arrangement "5", a bit train (1, 1, 1) is converted into the signal point arrangement "6", and a bit train (1, 1, 0) is converted into the signal point arrangement "7".

FIG. 15(b) shows a signal point arrangement for QPSK modulation. QPSK modulation can transmit a two-bit digital signal (d, e) by one symbol. There are four combinations of bits constituting one symbol, i.e., (0, 0), (0, 1), (1, 0) and (1, 1). In the example shown in FIG. 15(b), a bit train (1, 1) is converted into the signal point arrangement "1", a bit train (0, 1) is converted into the signal point arrangement "3", a bit train (0, 0) is converted into the signal point arrangement "5", and a bit train (1, 0) is converted into the signal point arrangement "7". The relation between the signal point arrangement and its number of each modulation method is defined in the same manner as 8PSK modulation.

FIG. 15(c) shows a signal point arrangement for BPSK modulation. BPSK modulation can transmit a one-bit digital signal (f) by one symbol. The digital signal (1) is converted into the signal point arrangement "0" and the digital signal (0) is converted into the signal point arrangement "4".

Next, the frame synchronization signal will be described. In the hierarchical transmission method, the frame synchronization signal modulated by BPSK having the lowest necessary C/N is transmitted. It is assumed herein that the bit stream of the frame synchronization signal constituted of 16 bits is (S0, S1, ..., S14, S15) and each bit is transmitted starting from S0. In this case, a bit stream (0, 0, 0, 1, 0, 0, 1, 1, 0, 1, 0, 1, 1, 1, 1, 0) and a bit stream with inverted last half eight bits (0, 0, 0, 1, 0, 0, 1, 1, 1, 0, 1, 0, 0, 0, 0, 1) are alternately transmitted for each frame. In the following, the bit stream of the frame synchronization signal is also written as "SYNCPAT", and the bit stream with inverted last half eight bits is also written as "nSYNCPAT". At transmission side this bit stream is converted into either the signal point arrangement "0" or "4" by BPSK mapping shown in FIG. 15(c), and the converted symbol stream is transmitted.

In order to capture the frame synchronization signal of 16 bits, i.e., 16 symbols BPSK-modulated and transmitted, the received symbols are required to be converted into bits by BPSK demapping shown in FIG. 16(a) opposite to the mapping at the transmission side. As shown in FIG. 16(a), if the demodulated signal is received in a hatched area on the reception side I-Q vector plane, it is judged as "1", whereas if it is received in an area not hatched, it is judged as "0". Namely, depending upon whether the demodulated signal is received on which area among the two areas divided by a bold BPSK determining borderline of FIG. 16(a), the output is judged as "1" or "0". This operation is called BPSK demapping.

The baseband signals I and Q are input to the BPSK demapper 3 to perform the bit conversion. The BPSK demapper 3 performs BPSK demapping and outputs a bit stream B0. In this specification, the term "demapper" means a demapping circuit. The bit stream B0 is input to the synchronism detection circuit 40 which captures the bit stream of the frame synchronization signal from the bit stream B0.

Next, the synchronism detection circuit 40 will be described with reference to FIG. 17. The bit stream B0 is input to a shift register D15 and sequentially shifted up to a shift register D0. At the same time, after the logical levels of the outputs of the shift registers D15 to D0 at predetermined bits are inverted, the outputs of the shift registers D15 to D0 are input to AND gates 51 and 52. An output SYNA0 of the AND gate 51 takes a high level when the status of the shift registers D15 to D0 (D0, D1, . . . , D14, D15) becomes (0, 0, 0, 1, 0, 0, 1, 1, 0, 1, 0, 1, 1, 1, 1, 0), whereas an output SYNB0 of the AND gate 52 takes a high level when the status becomes (0, 0, 0, 1, 0, 0, 1, 1, 1, 0, 1, 0, 0, 0, 0, 1). Namely, when SYNCPAT is captured, the output SYNA0 takes the high level, and when nSYNCPAT is captured, the output SYNB0 takes the high level.

The outputs SYNNA0 and SYNB0 of the synchronism detection circuit 40 are input to the frame synchronization circuit 5 which judges that there is a frame synchronization if it confirms that SYNNA0 and SYNB0 are alternately received at a predetermined frame pitch, and outputs a frame synchronization pulse at each frame period.

Generally, in the hierarchical transmission method with a time sequential combination of different modulation methods having different necessary C/N to be repeated for each frame, header data representative of such a frame multiplexing structure is multiplexed. After it is judged that there is a frame synchronization, the header data representative of the frame multiplexing structure is extracted in response to a timing signal generated from the frame synchronization pulse output from the frame synchronization circuit 5. It is therefore possible to start processing for each modulation method only after the frame multiplexing structure is identified.

In other words, until the frame synchronization is judged, the demodulation circuit 1 operates as an 8PSK demodulation circuit. Therefore, depending upon the phase of a demodulation carrier reproduced by a carrier reproduction circuit of the demodulation circuit 1, the I and Q axes of the reception side I-Q vector plane rotate and change their phases by $\theta=45°\times n$ (n is an integer of 0 to 7) relative to the transmission side I-Q vector plane. More specifically, depending upon the phase of the demodulation carrier, the symbol stream of the frame synchronization signal BPSK-mapped at the signal point arrangement "0" for the bit "1" and at the signal point arrangement "14" for the bit "0" shown in FIG. 15(c), may appear at the signal point arrangements "0" and "4" if $\theta=0°$ same as the transmission side, at the signal point arrangements "1" and "5" if the phase rotation $\theta=45°$, at the signal point arrangements "2" and "6" if the phase rotation $\theta=90$, and so on. There are, therefore, eight phases at which the frame synchronization signal is demodulated. It is necessary to capture the frame synchronization signal even if it is demodulated at which phase.

Therefore, as shown in FIG. 18, the BPSK demapper 3 is constituted of BPSK demappers 30 to 37 corresponding to the phase rotations of $\theta=0°$ (n=0), $\theta=45°$ (n=1), $\theta=90°$ (n=2), . . . , $\theta=270°$ (n=6), and $\theta=315°$ (n=7).

FIG. 16(b) illustrates BPSK demapping wherein the symbol list of the demodulated frame synchronization signal has the phase rotation of $\theta=45°$ so that the bit "1" appears at the signal point arrangement "1" and the bit "0" appears at the signal point arrangement "5". The bold BPSK determining borderline shown in FIG. 16(b) rotates by 45° in the counter-clockwise direction relative to the bold BPSK determining borderline of BPSK demapping with the same phase as the transmission side shown in FIG. 16(a). By using such a BPSK demapper, the frame synchronization signal rotated by $\theta=45°$ can be captured stably. This output of the BPSK demapper 3 corresponds to an output B1 shown in FIG. 14. B2 to B7 are outputs of the BPSK demapper 3 corresponding to $\theta=45°\times n$ (n is an integer of 2 to 7).

The circuit structures of the synchronism detection circuits 41 to 47 are the same as the synchronism detection circuit 40. Since the synchronism detection circuits 40 to 47 are provided, the frame synchronization signal can be captured by at least one or more of the synchronism detection circuits 40 to 47, irrespective of the phase rotation of the baseband signals caused by the phase of the reproduction carrier reproduced by the carrier reproduction circuit of the demodulation circuit 1. The synchronism detection circuit captured the frame synchronization signal outputs SYNAn or SYNBn (n is an integer of 0 to 7) in accordance with the pattern (SYNCPAT or nSYNCPAT) of the captured frame synchronization signal.

The SYNAn and SYNBn signals are received by OR gates 53 and 54 of the frame synchronization circuit 5 shown in FIGS. 19(a) and 19(b). If it is confirmed that a logical sum SYNA of SYNAn of the OR gate 53 and a logical sum SYNB of SYNBn of the OR gate 54 are alternately received at a predetermined frame pitch, it is judged that there is a frame synchronization and a frame synchronization pulse is output at each frame period.

The operation of the frame synchronism detection block 2 shown in FIG. 14 which captures the frame synchronization signal and outputs the frame synchronization pulse has been described above. Next, absolute-phasing will be described in which a currently received signal phase rotation angle is calculated from the signal point arrangement of the captured frame synchronization signal, and the demodulated baseband signals are rotated in a reverse phase direction in accordance with the calculated phase rotation angle.

The symbol stream of the frame synchronization signal obtained from the baseband signals BPSK-mapped and transmitted from the transmission side and demodulated by the demodulation circuit 1, is demapped by the BPSK demapper 3 into a bit "1" or "0". The phase difference between the symbol streams of the frame synchronization signals demapped to the bits "1" and "0" is 180°. Therefore, if the phase of the symbol stream of the frame synchronization signal to be demapped to the bit "0" is rotated by 180°, symbol streams all demapped to the bit "1" can be obtained.

By calculating an average of symbol streams all demapped to the bit "1", the reception side signal point arrangement for the BPSK bit "1" can be obtained. A phase difference between the obtained reception side signal point arrangement for the BPSK bit "1" and the transmission side signal point arrangement "0" mapped for the bit "1" is calculated. This phase difference is used as the reception signal phase rotation angle θ, and the demodulated baseband signals are rotated in a reverse phase direction to realize the absolute-phasing of the baseband signals.

A conventional absolute-phasing synchronization capturing circuit shown in FIG. 14 will further be described. Upon reception of the frame synchronization pulse output from the frame synchronization circuit 5, the frame synchronization signal generator 6 generates a bit stream of the captured frame synchronization signal corresponding to its pattern of SYNCPAT or nSYNCPAT. The generated bit stream is supplied to the 0°/180° phase rotation circuit 83 of the received signal phase detection block 8. In accordance with the bit "0" or "1" of the supplied bit stream, the 0°/180° phase rotation circuit 83 rotates the phase by 180° if the bit is "0", does not rotate the phase if the bit is "1", and outputs the bit stream.

The timings of the bit stream of the reproduced frame synchronization signal supplied from the frame synchronization signal generator 6 and the symbol stream of the frame synchronization signal are adjusted by the delay circuits 81 and 82 to make them coincide with each other at the inputs of the 0°/180° phase rotation circuit 83. Gates of the delay circuits 81 and 82 are opened upon reception of a frame synchronization signal section signal supplied from the frame synchronization signal generator 6, and symbol streams DI(8) and DQ(8) of the frame synchronization signals output from the delay circuits 81 and 82 are rotated by 180° in phase by the 0°/180° phase rotation circuit 83 if the bit stream is "0" and supplied to the accumulating/adding/averaging circuits 85 and 86.

FIG. 20(*a*) shows the signal point arrangement of the frame synchronization signal received at the received signal phase rotation angle of θ=0°, and FIG. 20(*b*) shows the signal point arrangement of the symbol streams VI(8) and VQ(8) after converted by the 0°/180° phase rotation circuit 83. The symbol streams VI(8) and VQ(8) are supplied to the accumulating/adding/averaging circuits 85 and 86 to be subjected to an adding/averaging operation in a predetermined section, and the symbol streams AVI(8) and AVQ(8) subjected to the adding/averaging operation in the predetermined section are output. This adding/averaging operation for the symbol streams VI(8) and VQ(8) is performed in order to reliably acquire the signal point arrangement even if the received baseband signals change slightly their phase because of a degraded reception C/N or even if the amplitudes thereof vary.

The accumulating/adding/averaging circuits 85 and 86 obtain reception signal points [AVI(8), AVQ(8)] for the BPSK mapped bit "1". Next, the reception signal points [AVI(8), AVQ(8)] are input to the received signal phase determining circuit 87 made of a ROM which obtains a 3-bit phase rotation signal RT(3) corresponding to the phase rotation angle, by using a reception signal phase determining table shown in FIG. 21. "0" to "7" shown in FIG. 21 indicate a decimal representation of the phase rotation signal RT(3). For example, if the received signal phase rotation angle is θ=0° as shown in FIG. 20(*a*), the phase rotation signal for the signal points AVI(8) and AVQ(8) is judged as "0" by the received signal phase determining table. Therefore, (0, 0, 0) is output as the phase rotation signal RT(3). If the received signal phase rotation angle is θ=45°, then the phase rotation signal RT(3) is "1" so that (0, 0,1) is output as the phase rotation signal RT(3).

Upon reception of this phase rotation signal RT(3), the remapper 7 made of a ROM rotates the phases of the baseband signals I(8) and Q(8) in accordance with the phase rotation signal RT(3) to thereby realize the absolute-phasing.

The operation of the remapper 7 will be described further. The remapper 7 is a phase conversion circuit for making the signal point arrangement of received baseband signals coincide with that of the transmission side. The received signal phase detection block 8 calculates the received signal phase rotation angle θ and supplies the phase rotation signal RT(3) corresponding to the received signal phase rotation angle θ to the remapper 7. The phase rotation signal RT(3) takes an integer of 0 to 7, and the relation to the phase rotation angle θ is defined by the following equation (1):

$$RT(3)=\theta/45 \quad (1)$$

where θ=n·45° and n is an integer of 0 to 7.

The absolute-phasing for the baseband signal is performed by a reverse phase rotation (−θ) relative to the phase rotation angle θ. Therefore, the remapper 7 rotates the phases of the input baseband signals I and Q by an angle φ (=−θ) in accordance with the following equations (2) and (3) and outputs the absolute-phased baseband signals I'(8) and Q'(8) (hereinafter may be written as I' and Q' where applicable by omitting the bit number):

$$I'=I\cos(\phi)-Q\sin(\phi) \quad (2)$$

$$Q'32\ I\sin(\phi)+Q\cos(\phi) \quad (3)$$

With the conventional absolute-phasing synchronization capturing circuit, however, the BPSK demapper is essential. If a ROM is used for the table conversion by the BPSK demapper, the memory capacity of 64 K bytes ($2^{16} \times 8$ bits) is necessary. The eight synchronism detection circuits require 128 registers in total, and a coincidence detection logical circuit of a large circuit scale is required in addition to the remapper. If a ROM is used for the table conversion by the remapper, the memory capacity of 1 M bytes ($2^{19} \times 16$ bits) is necessary. The circuit scale therefore becomes large.

SUMMARY OF THE INVENTION

It is an object of the present invention to provide an absolute-phasing synchronization capturing circuit with a small circuit scale.

The absolute-phasing synchronization capturing circuit of this invention for absolute-phasing of making a reception signal phase angle coincide with a transmission signal phase angle, by capturing a frame synchronization signal and by detecting the reception signal phase angle relative to the transmission signal phase angle from the captured frame synchronization signal, comprises: phase rotating means for rotating phases of demodulated baseband signals by 45°×n (n=1, 3, 5 or 7); first phase inverting means for inverting the phases of the demodulated baseband signals; second phase inverting means for inverting phases of baseband signals phase-rotated by the phase rotating means; and selecting means for selectively outputting the demodulated baseband signals, the baseband signals phase-rotated by the phase rotating means, baseband signals output from the first phase inverting means, and baseband signals output from the second phase inverting means, in accordance with the reception signal phase rotation angle relative to the transmission signal phase, wherein most significant bits are extracted from the demodulated baseband signals and from the baseband signals phase-rotated by the phase rotating means, and the frame synchronization signal is captured by using the extracted most significant bits.

According to the absolute-phasing synchronization capturing circuit of this invention, the demodulated baseband signals, the baseband signals phase-rotated by the phase rotating means, baseband signals output from the first phase inverting means, and baseband signals output from the second phase inverting means are selectively output in accordance with the reception signal phase rotation angle relative to the transmission signal phase, to thereby realize the absolute phasing of the reception signal. Most significant bits are extracted from the demodulated baseband signals and from the baseband signals phase-rotated by the phase rotating means, and the frame synchronization signal is captured by using the extracted most significant bits.

The phase rotating means performs a phase rotation by a fixed angle so that the structure thereof can be simplified and the phase rotating means can be configured by using a memory circuit and a logic circuit. As compared with table conversion using a memory circuit to be performed by a conventional necessary remapper, a necessary memory capacity can be reduced by ⅛ of the conventional memory capacity of $2^{19} \times 16$ bits. A conventionally necessary BPSK demapper is not necessary. As compared with table conversion using a memory circuit to be performed by a PSK demapper, a memory capacity of $2^{16} \times 16$ bits can be reduced.

Instead of extracting most significant bits from the demodulated baseband signals and from the baseband signals phase-rotated by the phase rotating means, they may be extracted from the baseband signals output from the first and second phase inverting means.

The absolute-phasing synchronization capturing circuit of this invention for absolute-phasing of making a reception signal phase angle coincide with a transmission signal phase angle, by capturing a frame synchronization signal and by detecting the reception signal phase angle relative to the transmission signal phase angle from the captured frame synchronization signal, comprises: a synchronism detection circuit for detecting a bit stream of a first frame synchronization signal alternately extracted from demodulated baseband signals, a bit stream of a second frame synchronization signal obtained by inverting sings of last half bits of the bit stream of the first frame synchronization signal, a bit stream of a third frame synchronization signal obtained by inverting a sign of each bit of the bit stream of the first frame synchronization signal, and a bit stream of a fourth frame synchronization signal obtained by inverting a sign of each bit of the bit stream of the second frame synchronization signal, wherein the frame synchronization signal is captured in accordance with an output from the synchronism detection circuit.

In the absolute-phasing synchronization capturing circuit, the outputs for the reception signal phase rotation angles of $\theta=0°$ and $180°$, $\theta=45°$ and $225°$, $\theta=90°$ and $270°$, and $\theta=135°$ and $315°$ have a logical inversion relation. Therefore, the synchronism detection circuit of the absolute-phasing synchronization capturing circuit detects only the bit streams of the extracted first and second frame synchronization signals, the bit stream of the third frame synchronization signal obtained by inverting the sign of each bit of the bit stream of the first frame synchronization signal, and the bit stream of the fourth frame synchronization signal obtained by inverting the sign of each bit of the bit stream of the second frame synchronization signal. The number of necessary synchronism detection circuits is a half of that of the conventional circuit, and the number of necessary shift resisters is a half of that of the conventional circuit. The circuit scale of the circuit can therefore be reduced.

The absolute-phasing synchronization capturing circuit of this invention for absolute-phasing of making a reception signal phase angle coincide with a transmission signal phase angle, by capturing a frame synchronization signal and by detecting the reception signal phase rotation angle relative to the transmission signal phase angle from the captured frame synchronization signal, comprises: accumulating/adding/subtracting/averaging means for extracting a bit stream of a frame synchronization signal from demodulated baseband signals over a frame synchronization signal section, performing an adding operation if the extracted bit stream of the frame synchronization signal has a logical level "1", performing a subtracting operation if the extracted bit stream of the frame synchronization signal has a logical level "0", and averaging adding/subtracting operation results, wherein a phase of a reception signal is determined in accordance with an out put from the accumulating/adding/subtracting/averaging means, and phases of the demodulated baseband signals are rotated by an amount of the determined phase.

A conventional 0°/180° phase rotation circuit using table conversion by a memory circuit or an arithmetic circuit is not necessary so that the circuit scale can be reduced. If the conventional 0°/180° phase rotation circuit utilizes table conversion by a memory circuit, the memory capacity of $2^{16} \times 16$ bits can be reduced and the circuit scale can be reduced.

BRIEF DESCRIPTION OF THE DRAWINGS

FIG. 2 shows a truth table of a logical transformation circuit of the absolute-phasing synchronization capturing circuit according to the first embodiment of the invention.

FIG. 3 shows a truth table of the logical transformation circuit of the absolute-phasing synchronization capturing circuit according to the first embodiment of the invention.

FIG. 6 shows a truth table showing logical operations to be performed by the synchronism detection circuit of the absolute-phasing synchronization capturing circuit according to the first embodiment of the invention.

FIG. 7 shows a truth table showing logical operations to be performed by the synchronism detection circuit of the absolute-phasing synchronization capturing circuit according to the first embodiment of the invention.

FIG. 8 is a block diagram showing the structure of a portion of a frame synchronization circuit of the absolute-phasing synchronization capturing circuit according to the first embodiment of the invention.

FIG. 9 shows a truth table of the logical transformation circuit of the absolute-phasing synchronization capturing circuit according to the first embodiment of the invention.

FIG. 10 shows a truth table of the logical transformation circuit of the absolute-phasing synchronization capturing circuit according to the first embodiment of the invention.

FIG. 15 is a diagram showing a signal point arrangement illustrating BPSK mapping.

FIG. 16 is a diagram illustrating BPSK demapping.

FIGS. 19(a) and 19(b) are block diagrams showing the structure of a portion of a frame synchronization circuit of the conventional absolute-phasing synchronization capturing circuit.

FIGS. 20(a) and 20(b) show single arrangements of a frame synchronization signal after processed by a 0°/180° phase rotation circuit of the conventional absolute-phasing synchronization capturing circuit.

EMBODIMENTS OF THE INVENTION

Figure 1:
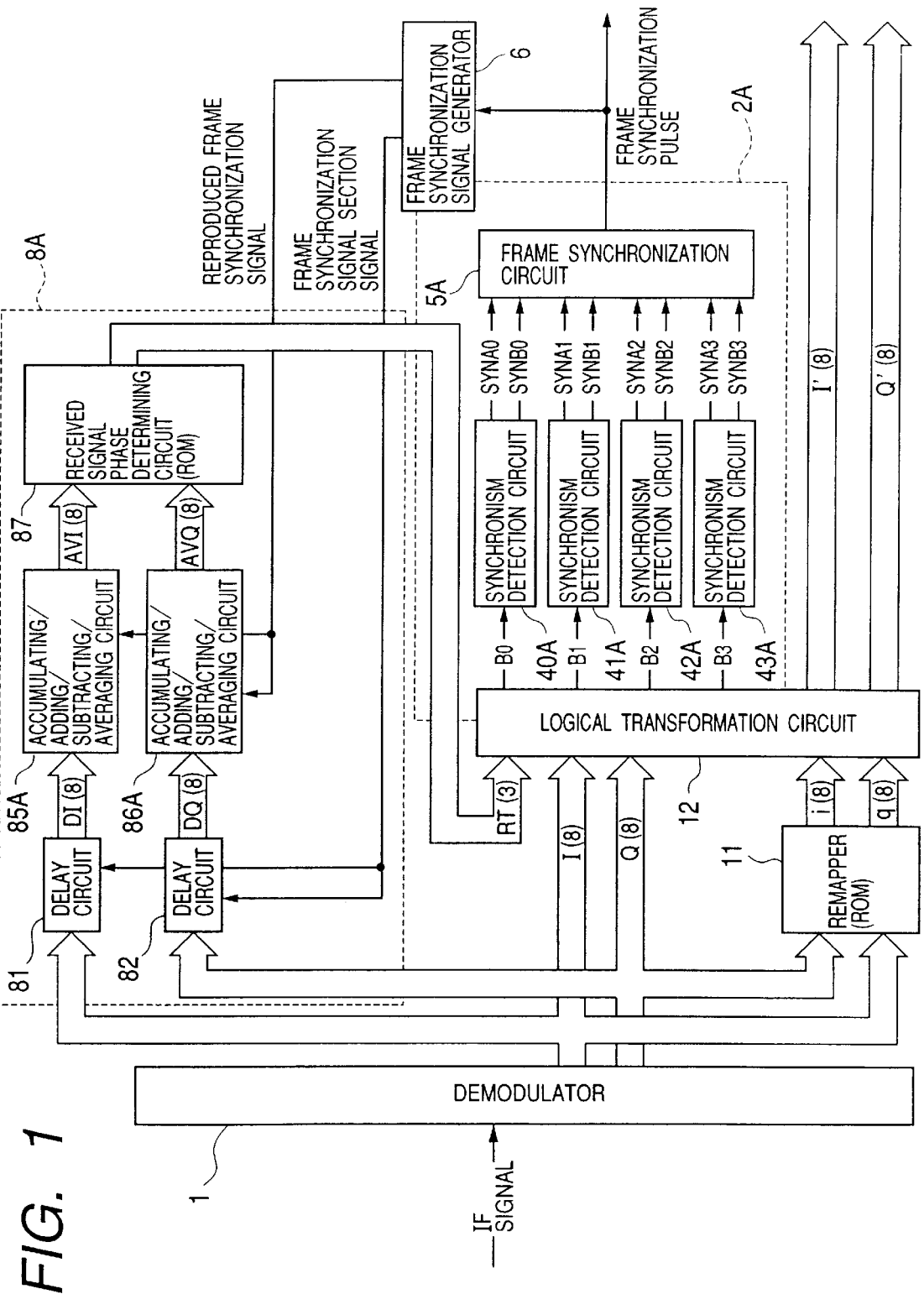
FIG. 1 is a block diagram showing the structure of an absolute-phasing synchronization capturing circuit according to a first embodiment of the invention.

The absolute-phasing synchronization capturing circuit according to the embodiments of the invention will be described. FIG. 1 is a block diagram showing the structure of an absolute-phasing synchronization capturing circuit according to a first embodiment of the invention.

The absolute-phasing synchronization capturing circuit according to the first embodiment of the invention has a demodulation circuit 1, a remapper 11 made of a ROM, a logical transformation circuit 12, a frame synchronism detection block 2A, a frame synchronization signal generator 6, and a received signal phase detection block 8A. The frame synchronism detection block 2A has synchronism detection circuits 40A to 43A and a frame synchronization circuit 5A. The received signal phase detection block 8A has delay circuits 81 and 82, accumulating/adding/subtracting/averaging circuits 85A and 86A, and a received signal phase determining circuit 87.

Baseband signals I(8) and Q(8) demodulated by the demodulation circuit 1 are supplied to the remapper 11 which rotates the baseband signals I(8) and Q(8) by a phase of θ=45° and outputs baseband signals i(8) and q(8).

First, the remapper 11 will be described. The remapper 11 is made of a ROM and rotates supplied baseband signals I(8) and Q(8) by a phase of θ=45° and outputs baseband signals i(8) and q(8).

Specifically, φ=−45° is substituted into the equations (2) and (3) to calculate the following equations (4) and (5) which result in the following equations (6) and (7):

$$i(8)=I \cos(-45°)-Q \sin(-45°) \quad (4)$$

$$q(8)=I \sin(-45°)+Q \cos(-45°) \quad (5)$$

$$i(8)=I(1/\sqrt{2})-Q(-1/\sqrt{2})=(1/\sqrt{2})(I+Q) \quad (6)$$

$$q(8)=I(-1/\sqrt{2})+Q(1/\sqrt{2})=(1/\sqrt{2})(-I+Q) \quad (7)$$

In the remapper 11, the input baseband signals I(8) and Q(8) are remapped into baseband signals rotated by a phase angle of 45° in the clockwise direction. This remapper 11 does not require an input of the phase rotation angle signal RT(3) so that the ROM memory capacity can be reduced to ⅛ of the conventional remapper 7.

The phase rotation angle signal RT(3) output from the received signal phase detection block 8A, the baseband signals I(8) and Q(8) demodulated by the demodulation circuit 1, and the baseband signals i(8) and q(8) remapped by the remapper 11 are input to the logical transformation circuit 12.

The logical transformation by the logical transformation circuit 12 input with such signals will be described. FIGS. 2(a) and 2(b) and FIG. 3 show truth tables illustrating the operation of the logical transformation circuit 12. The truth table shown in FIG. 2(a) is used for n=even, i.e., for θ=45°×n (n=0, 2, 4, 6), and the truth table shown in FIG. 2(b) is used for n=odd, i.e., for θ=45°×n (n=1, 3, 5, 7). The truth table shown in FIG. 2 shows BPSK demapping outputs for θ=45°×n (n=0, 1, 2, 3, 4, 5, 6, 7).

In accordance with the phase rotation angle signal RT(3), the input baseband signals I(8) and Q(8) are logically transformed into the absolute-phase baseband signals I'(8) and Q'(8) by using the truth table shown in FIG. 2(a) if n=even. For example, if the phase rotation angle signal RT(3) is "000", it means the reception at the absolute phase. Therefore, the baseband signal I'(8) is the baseband signal I(8), and the baseband signal Q'(8) is the baseband signal Q(8). If the phase rotation angle signal RT(3) is "010", it means the phase rotation angle of θ=90°. In this case, the equations (2) and (3) have been used conventionally to convert as in the following equations (8) and (9):

$$I'(8)=I \cos(-90°)-Q \sin(-90°)=Q(8) \quad (8)$$

$$Q'(8)=I \sin(-90°)+Q \cos(-90°)=-I(8) \quad (9)$$

This conversion, however, can be realized simply by inverting the sign of the baseband signal I(8) input to the logical transformation circuit 12 and by replacing the baseband signal Q(8) by the sign inverted baseband signal I(8). Similarly, for the phase rotation angle signals RT(3)="100" and RT(3)="110", the conversion can be performed by using the truth table shown in FIG. 2(a).

In accordance with the phase rotation angle signal RT(3), the input baseband signals i(8) and q(8) are logically transformed into the absolute-phase baseband signals I'(8) and Q'(8) by using the truth table shown in FIG. 2(b) if n=odd. For example, if the phase rotation angle signal RT(3) is "001", it means the phase rotation angle of θ=45°. Therefore, the baseband signal I'(8) is the baseband signal i(8), and the baseband signal Q'(8) is the baseband signal q(8). It is sufficient therefore if the baseband signals i(8) and q(8) themselves output from the remapper 11 are used as the baseband signals I'(8) and Q'(8).

If the phase rotation angle signal RT(3) is "011", it means the phase rotation angle of θ=135°. In this case, the baseband signals i(8) and q(8) whose phases are rotated by the phase rotation angle of θ=45°, are further rotated by a phase rotation angle of θ=90°. Therefore, the following equations (10) and (11) are calculated:

$$I'=i \cos(-90°)-q \sin(-90°)=q(8) \quad (10)$$

$$Q'=i \sin(-90')+q \cos(-90°)=-i(8) \quad (11)$$

Therefore, this conversion can be realized simply by inverting the sign of the baseband signal i(8) input to the logical transformation circuit 12 and by replacing the baseband signal q(8) by the sign inverted baseband signal i(8). Similarly, for the phase rotation angle signals RT(3)="101" and RT(3)="111", the conversion can be performed by using the truth table shown in FIG. 2(b).

The logical transformation circuit 12 receives the phase rotation angle signal RT(3) corresponding to the phase rotation angle θ, baseband signals I(8) and Q(8), and baseband signals i(8) and q(8) remapped by the remapper 11, and performs the logical transformation by using the truth table shown in FIG. 3 to output the BPSK demapped outputs to the synchronism detection circuits 40A, 41A, 42A and 43A.

The operation of the logical transformation circuit 12 including the BPSK demapping will be specifically described with reference to FIG. 4. Inverters 121 to 124 of the logical transformation circuit 12 invert the signs of the baseband signals I(8) and Q(8) and the baseband signals I(8) and q(*) whose phases were rotated by the remapper 11 by the angle of θ=45°. A multiplexer 125 selects proper baseband signals from the supplied baseband signals I(8), Q(8), i(8) and q(8) and the supplied sign-inverted baseband signals I(8), Q(8), i(8) and q(8), in accordance with the phase rotation angle signal RT(3), and outputs the selected baseband signals as output baseband signals I'(8) and Q'(8). This selection of the output baseband signals I'(8) and Q'(8) by the multiplexer 125 is performed in accordance with the truth tables shown in FIGS. 2(a) and 2(b).

Figure 4:
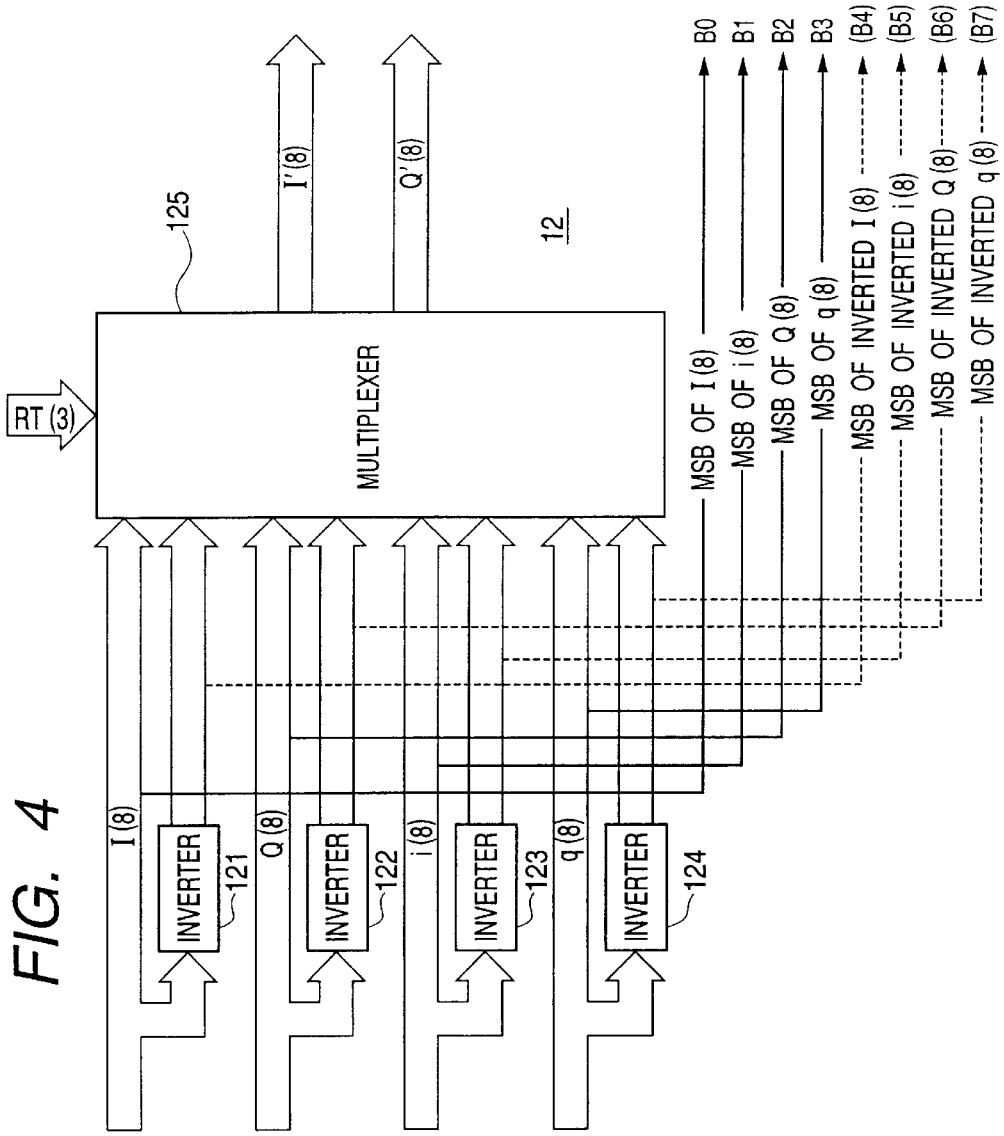
FIG. 4 is a block diagram showing the structure of the logical transformation circuit of the absolute-phasing synchronization capturing circuit according to the first embodiment of the invention.

Further, as indicated by solid lines in FIG. 4, of the baseband signals input to the multiplexer 125, an MSB of I(8) is extracted to use it as an output B0, an MSB of i(8) is extracted to use it as an output B1, an MSB of Q(8) is extracted to use it as an output B2, and an MSB of q(8) is extracted to use it as an output B3, respectively to the synchronism detection circuits 40A to 43A. A circuit specialized to the BPSK demapping is therefore unnecessary and the conventionally used BPSK demapper 3 is not necessary. If a ROM is used for the table conversion by the BPSK demapper 3, this ROM is not necessary and the memory having a capacity of $2^{16} \times 8$ bits can be omitted.

This can be clarified from the BPSK demapping illustrated in FIG. 16. Namely, in FIG. 16(a), the judgement result that the signal point of the baseband signal is the bit "1" or "0" is equal to the I axes of the signal point, i.e., the MSB of the baseband signal I(8). The judgement result for θ=45° shown in FIG. 16(b) is equal to the MSB of the baseband signal i(8) output from the remapper 11. This is also applicable to the judgement results for other phase rotation angles. From this reason, the conventionally used BPSK demapper 3 can be omitted.

As indicated by broken lines in FIG. 4, of the baseband signals input to the multiplexer 125, an MSB of an inverted I(8) may be extracted to use it as an output B0, an MSB of an inverted i(8) may be extracted to use it as an output B1, an MSB of an inverted Q(8) may be extracted to use it as an output B2, and an MSB of an inverted q(8) may be extracted to use it as an output B3, respectively to the synchronism detection circuits 40A to 43A.

This is apparent from the logical inversion relations between the outputs for θ=0° and θ=180°, between the outputs for θ=45° and θ=225°, between the outputs for θ=90° and θ=270°, and between the outputs for θ=135° and θ=315°.

Next, the synchronism detection circuits 40A to 43A will be described by taking as a representative example the synchronism detection circuit 40A. Also for the synchronism detection by the synchronism detection circuit, the logical inversion relations are used between the outputs for θ=0° and θ=180°, between the outputs for θ=45° and θ=225°, between the outputs for θ=90° and θ=270°, and between the outputs for θ=135° and θ=315°. The synchronism detection circuit is configured so that it can detect "SYNCPAT", "nSYNCPAT" and these logically inverted bit streams.

Figure 5:
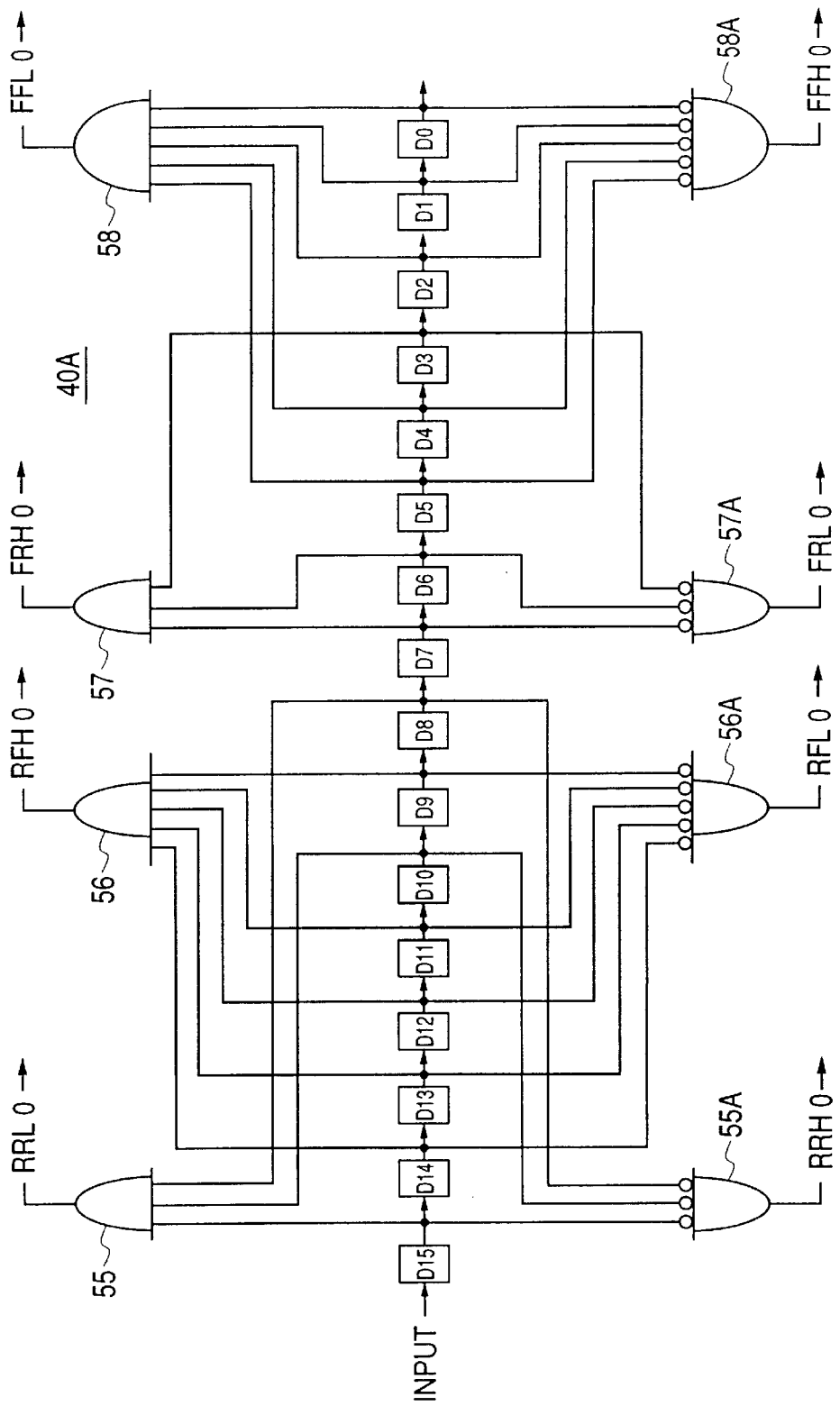
FIG. 5 is a block diagram showing the structure of a synchronism detection circuit of the absolute-phasing synchronization capturing circuit according to the first embodiment of the invention.

FIG. 5 shows an embodiment of the synchronism detection circuit 40A. The synchronism detection circuit 40A is constituted of: shift registers D0 to D15; an AND gate 55 input with outputs from the shift registers D15, D10 and DB; an AND gate 55A input with inverted outputs from the shift registers D15, D10 and D0; an AND gate 56 input with outputs from the shift registers D14 to D11 and D9; an AND gate 56A input with inverted outputs from the shift registers D14 to D11 and D9; an AND gate 57 input with outputs from the shift registers D7, D6 and D3; an AND gate 57A input with inverted outputs from the shift registers D7, D6 and D3; an AND gate 58 input with outputs from the shift registers D5, D4, and D2 to D0; and an AND gate 58A input with inverted outputs from the shift registers D5, D4, and D2 to D0.

The bit streams of the frame synchronization signals capable of being captured by the synchronism detection circuit 40A are "SYNCPAT" and "nSYNCPAT" as well as these logically inverted bit streams of the frame synchronization signals, i.e., (1, 1, 1, 0, 1, 1, 0, 0, 1, 0, 1, 0, 0, 0, 0, 1) and last half 8-bit inverted bit stream (1, 1, 1, 0, 1, 1, 0, 0, 0, 1, 0, 1, 1, 1, 1, 0) which are also written as "SYNCNPAT" and "nSYNCNPAT" respectively.

The last half 8 bits of "SYNCPAT" are equal to the last half 8 bits of "nSYNCNPAT", and the last half 8 bits of "nSYNCPAT" are equal to the last half 8 bits of "nSYNCNPAT". The frame synchronization signal is divided into the first half 8 bits and the last half 8 bits. The synchronism detection circuit 40A can capture the bit streams of the frame synchronization signals of "SYNCPAT", "nSYNCPAT", "SYNCNPAT" and "nSYNCNPAT", by performing AND operations of the outputs RRL0, RFH0, FRH0 and FFL0 from the AND gates 55 to 58 and the outputs of RRH0, RFL0, FRL0 and FFH0 from the AND gates 55A to 58A, as shown in FIG. 6.

The logical operations shown in FIG. 6 are performed in accordance with the AND operation outputs. Therefore, the bit streams of the frame synchronization signals of "SYNCPAT", "nSYNCPAT", "SYNCNPAT" and "nSYNCNPAT" can be captured. Further, as shown in FIG. 7, the synchronization detection output SYNA0 can be obtained through the OR operation of "SYNCPAT" and "SYNCNPAT", and the synchronization detection output SYNB0 can be obtained through the OR operation of "nSYNCPAT" and "nSYNCNPAT".

The above description is also applicable to the synchronism detection circuits 41A, 42A and 43A. The outputs of the AND gates of the synchronism detection circuits 41A, 42A and 43A are used as the outputs RRH1 to RRH3, RFL1 to RFL3, FRL1 to FRL3, and FFH1 to FFH3, and the AND operations and OR operations shown in FIGS. 6 and 7 are performed. It is therefore possible to obtain the synchronization detection outputs SYNA1, SYNB1, SYNA2, SYNB2, SYNA3 and SYNB3.

As described above, the synchronism detection circuit 40A can provide the functions of both the conventional synchronism detection circuits 40 and 44. Therefore, the synchronism detection circuits 40A to 43A input with the BPSK demapping outputs B0 to B3 from the logical transformation circuit 12 corresponding to the angles θ of 0°, 45°, 90° and 135° can capture the frame synchronization signals corresponding to all the received signal phase rotation angles.

The numbers of synchronism detection circuits and shift registers are halved as compared to the conventional circuit. The circuit scale can therefore be reduced.

The outputs of the synchronism detection circuits 40A to 43A are supplied to the frame synchronization circuit 5A having OR gates 61 and 62 shown in FIG. 8. If it is confirmed that a OR output SYNA of SYNAα (α=0 to 3) and a OR output SYNB of SYNBα (α=0 to 3) are alternately received at a predetermined frame pitch, it is judged that there is a frame synchronization and a frame synchronization pulse is output at each frame period. This operation is similar to the conventional circuit.

Next, the frame synchronization circuit 5A, frame synchronization signal generator 6 and received signal phase detection block 8A will be described. The demodulated baseband signals I(8) and Q(8) are supplied to the received signal phase detection block 8A to detect the phase rotation angle signal RT(3).

Upon reception of the frame synchronization pulse output from the frame synchronization circuit 5A, the frame synchronization signal generator 6 supplies a reproduced frame synchronization signal and a frame synchronization signal section signal to the received signal phase detection block 8A.

The symbol streams of the frame synchronization signals in the demodulated baseband signals I(8) and Q(8) are supplied via the delay circuits 81 and 82 to the accumulating/adding/subtracting/averaging circuits 85A and 86A. In this case, the delay circuits 81 and 82 operate to make the input timing of the accumulating/adding/subtracting/averaging circuits 85A and 86A coincide with the input timing of the reproduced frame synchronization signal output from the frame synchronization signal generator 6. The input gates of the accumulating/adding/subtracting/averaging circuits 85A and 86A are opened in response to the frame synchronization signal section signal output from the frame synchronization signal generator 6, so that the symbol streams DI(8) and DQ(8) of the frame synchronization signals output from the delay circuits 81 and 82 are subjected to an adding/subtracting process by the accumulating/adding/subtracting/averaging circuits 85A and 86A.

For the adding/subtracting operation by the accumulating/adding/subtracting/averaging circuits 85A and 86A, an adding operation is performed if the bit stream is "1", whereas a subtracting operation is performed if the bit stream is "0". After the adding/subtracting operation for a predetermined number of sections, an averaging operation is performed to output averaged reception point signals AVI(8) and AVQ(8) from the accumulating/adding/subtracting/averaging circuits 85A and 86A.

The reception point signals AVI(8) and AV(8) output from the accumulating/adding/subtracting/averaging circuits 85A and 86A are input to the received signal phase determining circuit 87 made of a ROM. By referring to the received signal phase determining table, the phase rotation angle signal RT(3) of three bits corresponding to the received signal phase rotation angle is output to the logical transformation circuit 12. The logical transformation circuit 12 received the phase rotation angle signal RT(3) operates in the manner described already.

The received signal phase detection block 8A uses the accumulating/adding/subtracting/averaging circuits 85A and 86A, in place of the 0°/180° phase rotation circuit 83 and accumulating/adding/averaging circuits 85 and 86 respectively of the received signal phase detection block 8. The 180° phase rotation to be performed by the 0°/180° phase rotation circuit 83 is equal to the sign inversion of each axis. Therefore, the accumulating/adding operation for the 180° phase rotated reception symbol at each axis is equal to the accumulating/subtracting operation at each axis. It is therefore possible to replace the 0°/180° phase rotation circuit 83 and accumulating/adding/averaging circuits 85 and 86 by the accumulating/adding/subtracting/averaging circuits 85A and 86A. If the 0°/180° phase rotation circuit 83 is made of a ROM, a memory capacity of 128 k bytes (=$2^{16}$×16 bits) can be reduced. The received signal phase detection block 8A may be used in place of the received signal phase detection block 8 of the conventional absolute-phasing synchronization capturing circuit shown in FIG. 14. Also in this case, if a ROM is used for the table conversion by the 0°/180° phase rotation circuit 83, a memory capacity of 128 k bytes can be reduced.

In the absolute-phasing synchronization capturing circuit of the first embodiment described above, although the remapper 11 rotates the phases of the baseband signals i(8) and q(8) by θ=45°, the remapper 11 may rotate the phase by θ=135°, 225° or 315°.

In this case, in order to obtain the BPSK demapping outputs, although the logical transformation circuit 12 performs the same logical transformation shown in FIG. 2(*a*), it performs a logical transformation shown in FIG. 9(*a*) in place of the logical transformation shown in FIG. 2(*b*) if the phase rotation by θ=135° among θ=45°×n (1, 3, 5, 7) is to be performed. If the phase rotation by θ=225° is to be performed, the logical transformation shown in FIG. 9(*b*) is performed, and if the phase rotation by θ=315° is to be performed, the logical transformation shown in FIG. 9(*c*) is performed. In addition, in place of the logical transformation shown in FIG. 3, the logical transformation shown in FIG. 10(*a*), 10(*b*) or 10(*c*) corresponding to the logical transformation shown in FIG. 9(*a*), 9(*b*) or 9(*c*) is performed respectively.

Figure 11:
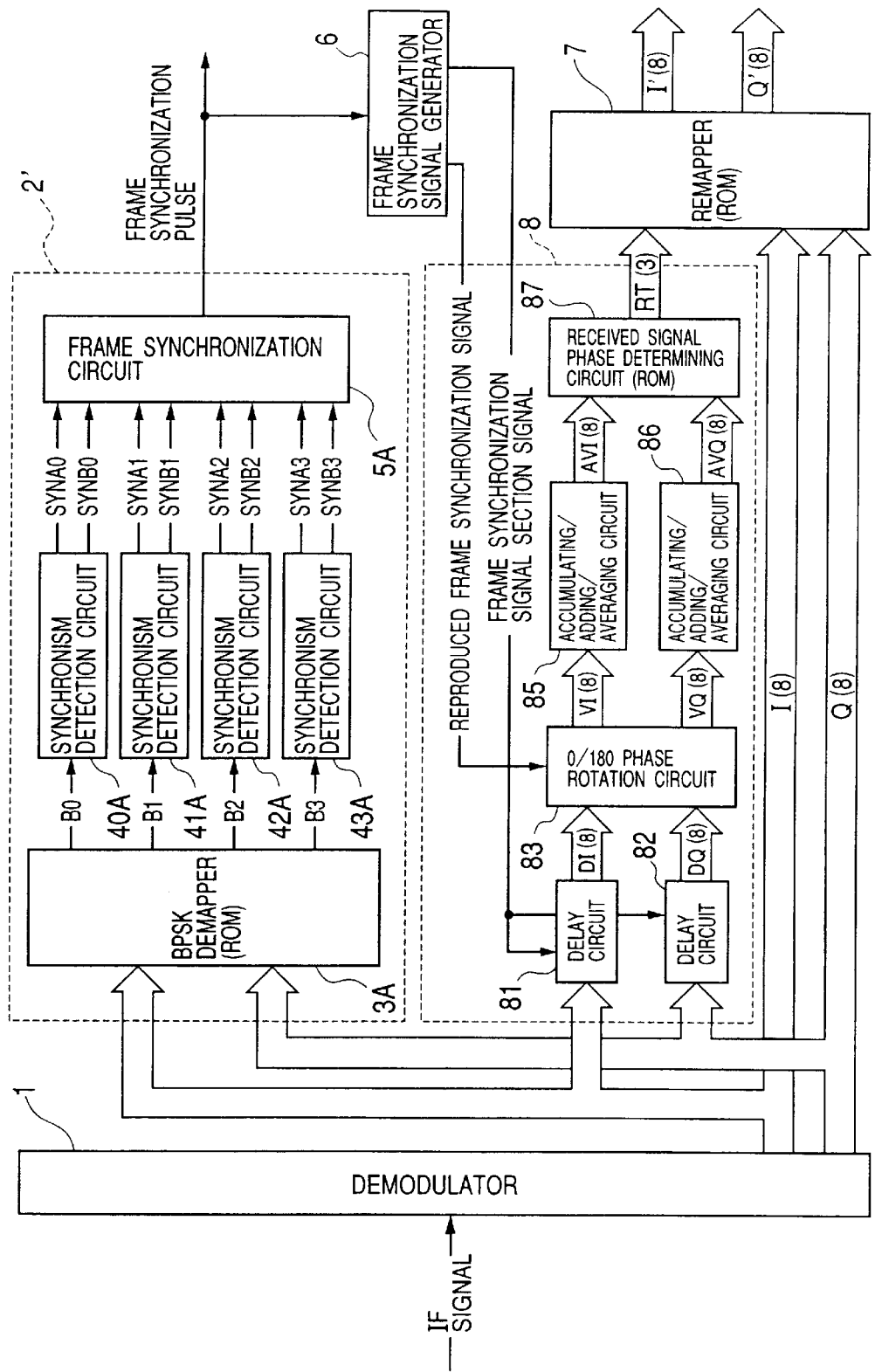
FIG. 11 is a block diagram showing the structure of an absolute-phasing synchronization capturing circuit according to a second embodiment of the invention.

The absolute-phasing synchronization capturing circuit according to a second embodiment of the invention will be described. FIG. 11 is a block diagram showing the structure of the absolute-phasing synchronization capturing circuit according to the second embodiment of the invention.

Figure 14:
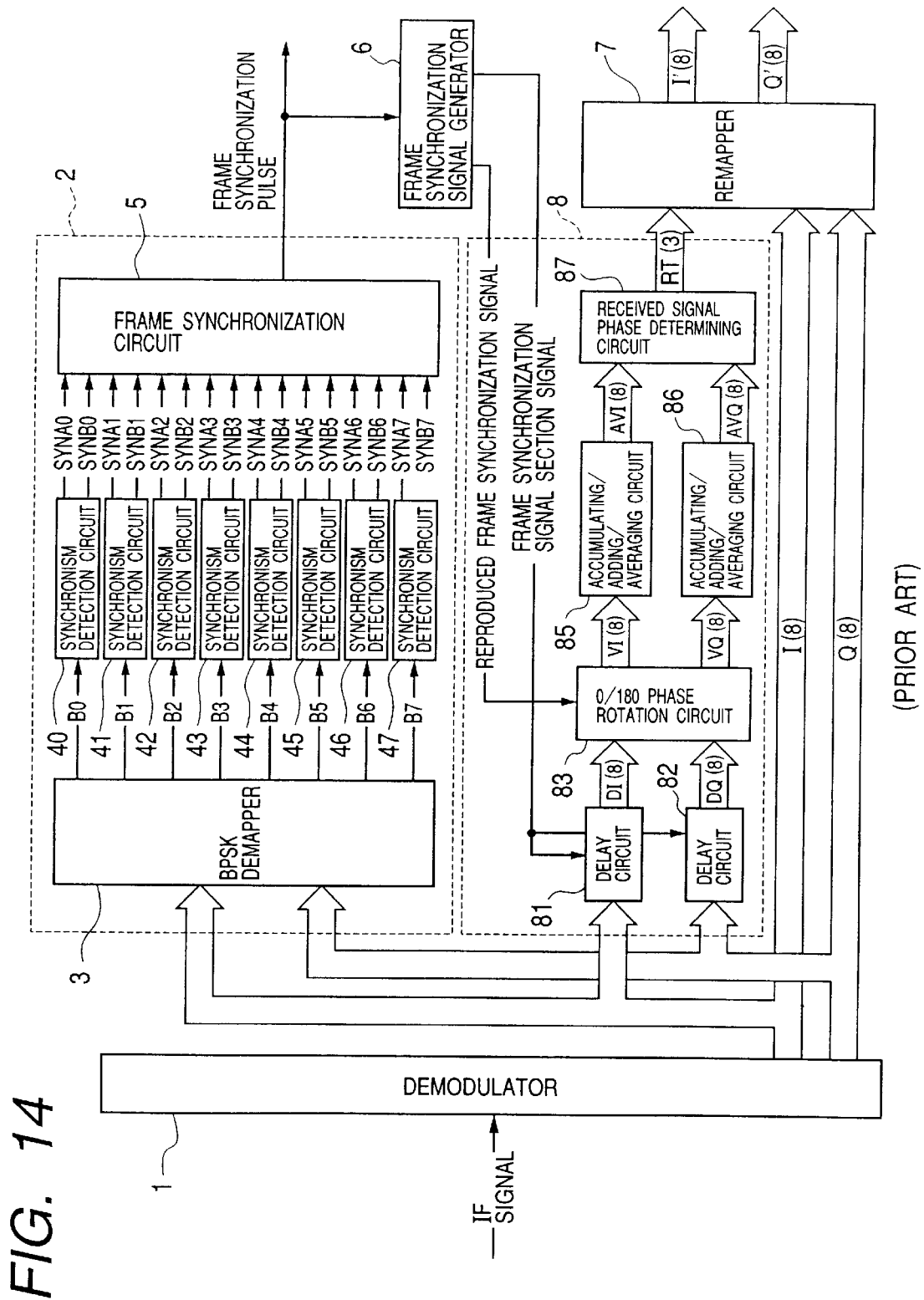
FIG. 14 is a block diagram showing the structure of a conventional absolute-phasing synchronization capturing circuit.
Figure 17:
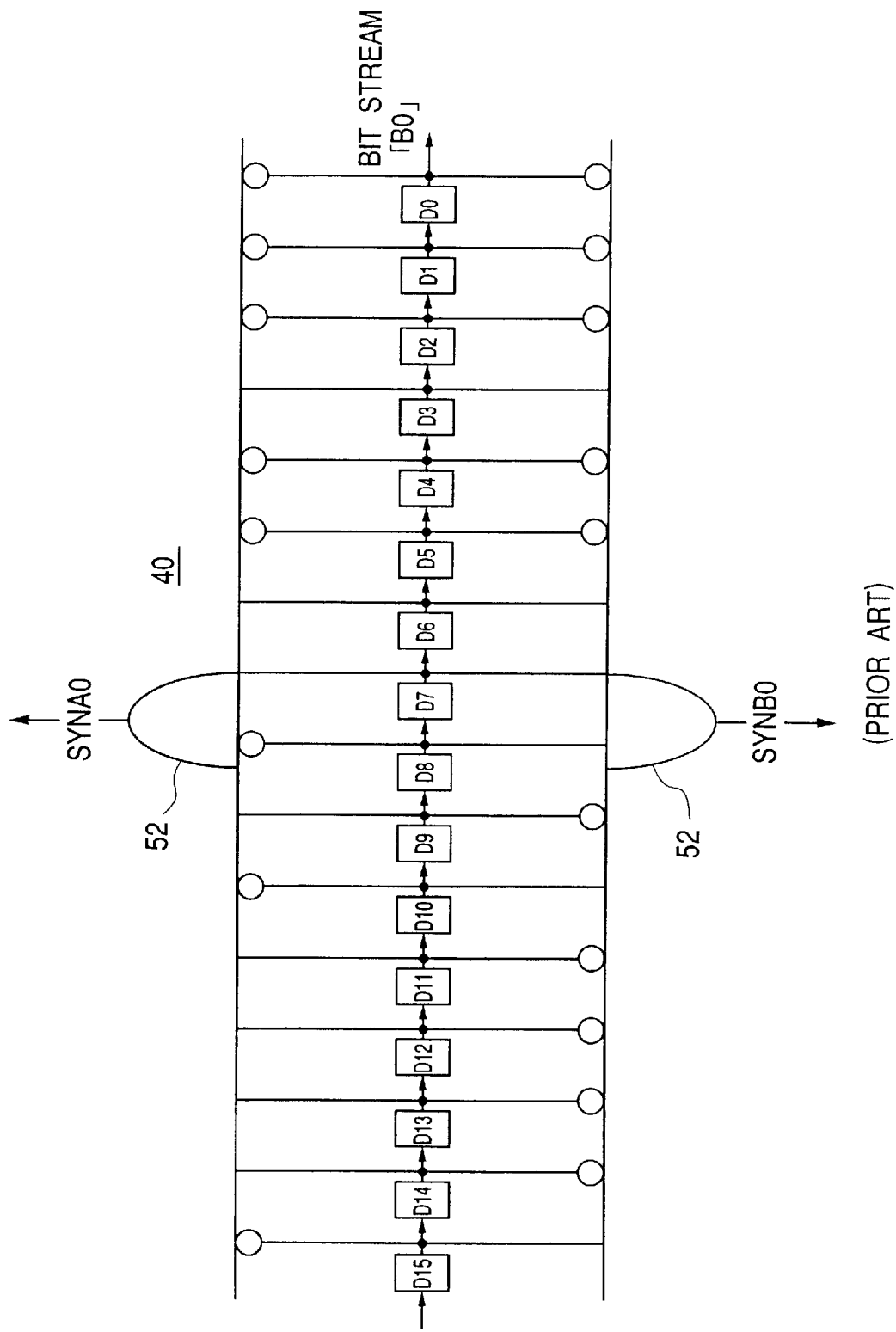
FIG. 17 is a block diagram showing the structure of a portion of a synchronism detection circuit of the conventional absolute-phasing synchronization capturing circuit.
Figure 18:
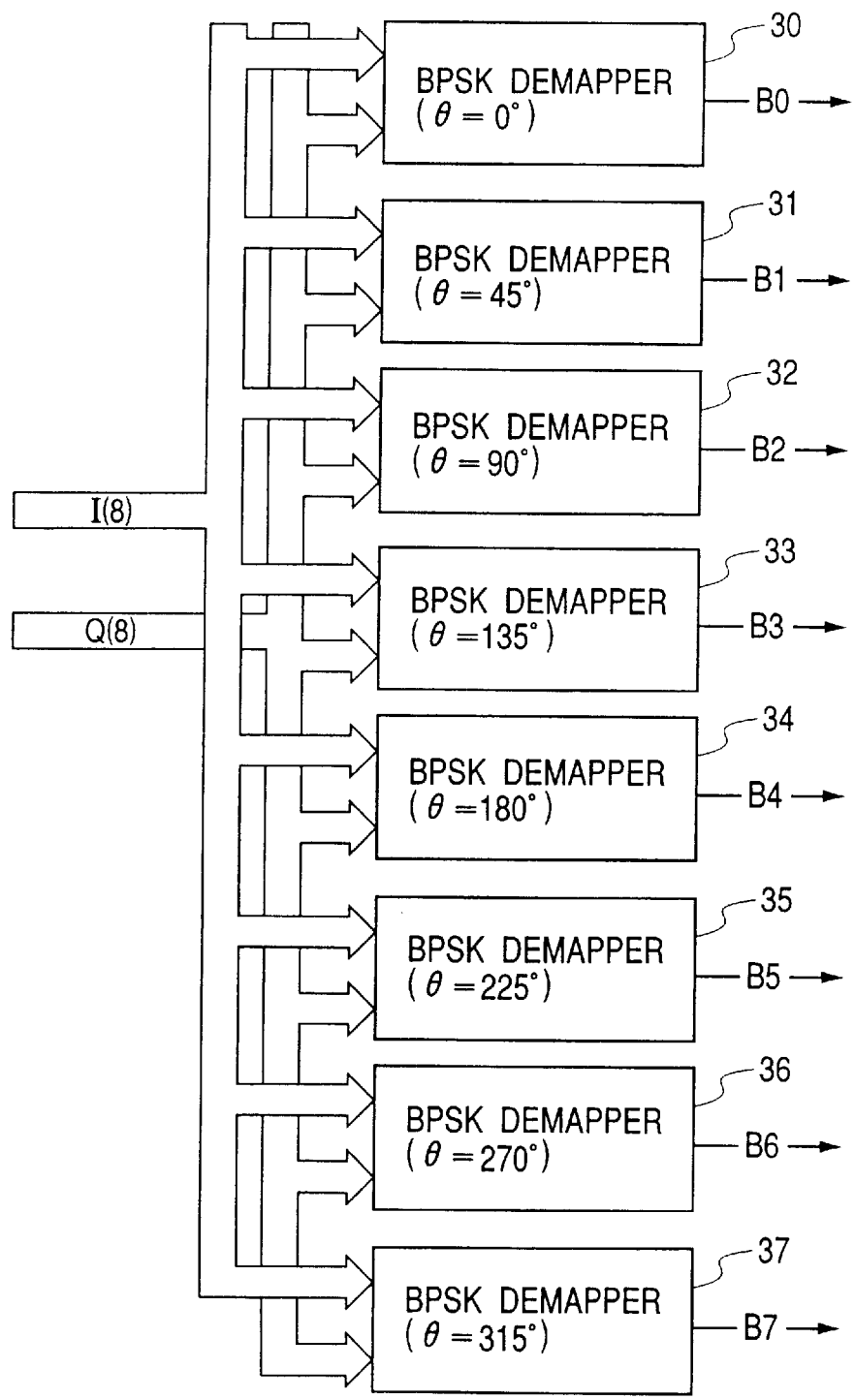
FIG. 18 is a block diagram showing the structure of a BPSK demapper of the conventional absolute-phasing synchronization capturing circuit.
Figure 21:
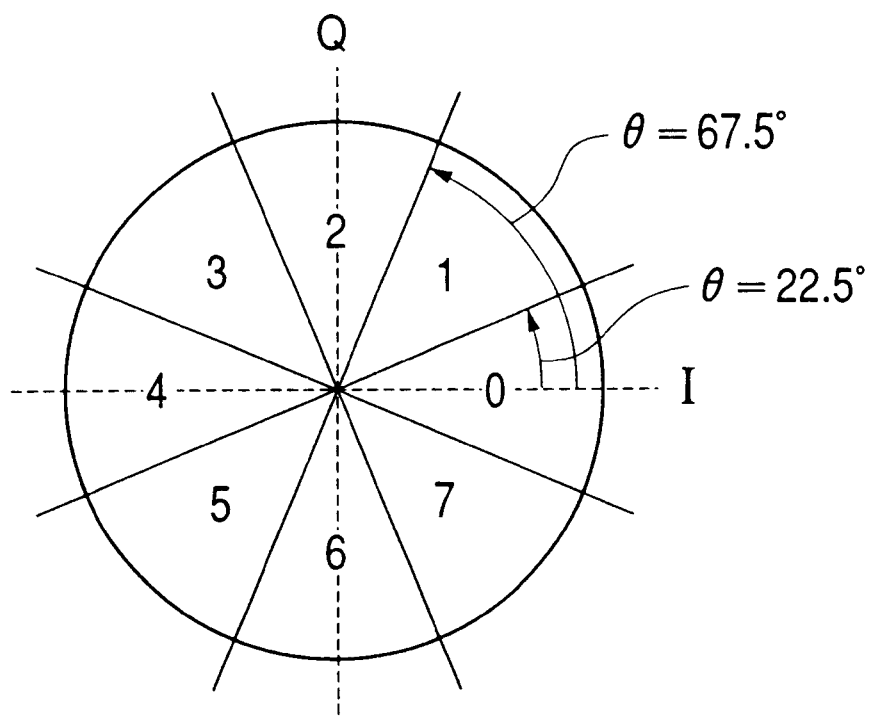
FIG. 21 is a diagram illustrating the contents of a received signal phase determining table.

In the absolute-phasing synchronization capturing circuit according to the second embodiment of the invention, a frame synchronization detection block 2' is used in place of the frame synchronization detection block 2 of the conventional absolute-phasing synchronization capturing circuit shown in FIG. 14. The other structures are the same as those of the conventional absolute-phasing synchronization capturing circuit.

Figure 12:
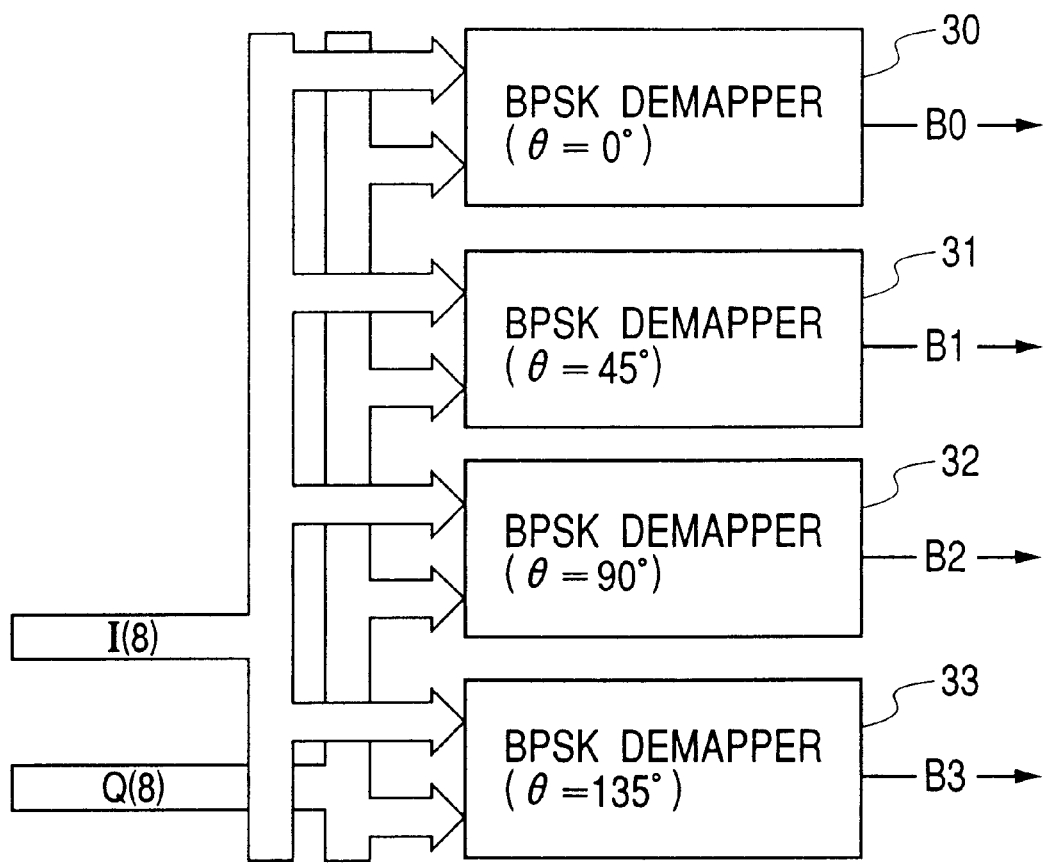
FIG. 12 is a block diagram showing the structure of a BPSK demapper of the absolute-phasing synchronization capturing circuit according to the second embodiment of the invention.

The frame synchronization detection block 2' will be described. As shown in FIG. 12, a BPSK demapper 3A includes BPSK demappers 30, 31, 32 and 33 which output B0, B1, B2 and B3, respectively. These outputs are supplied to synchronism detection circuits 40A, 41A, 42A and 43A. The synchronism detection circuits have the structure shown in FIG. 5 and perform the logical operation shown in FIGS. 6 and 7. Outputs SYNA0 and SYNB0 of the synchronism detection circuit 40A, outputs SYNA1 and SYNB1 of the synchronism detection circuit 41A, outputs SYNA2 and SYNB2 of the synchronism detection circuit 42A, and outputs SYNA3 and SYNB3 of the synchronism detection circuit 43A are supplied to a frame synchronization detection circuit 5A having the OR gate circuit shown in FIG. 8.

In the absolute-phasing synchronization capturing circuit constructed as above according to the second embodiment of the invention, the frame synchronization detection block 2' receives the demodulated baseband signals I(8) and Q(8), and the BPSK demapper 3A performs BPSK demapping to obtain the outputs B0, B1, B2 and B3. Similar to the absolute-phasing synchronization capturing circuit according to the first embodiment of the invention, the synchronism detection circuits 40A to 43A supply the outputs SYNAα and SYNBα to the frame synchronization circuit 5A which in turn outputs the frame synchronization pulse.

According to the absolute-phasing synchronization capturing circuit according to the second embodiment of the invention, the circuit scale of the BPSK demapper 3A is a half of that of the BPSK demapper 3, the number of synchronism detection circuits is only four including the synchronism detection circuits 40A to 43A, and the circuit scale of the synchronism detection circuits is halved as compared to the conventional circuit.

Figure 13:
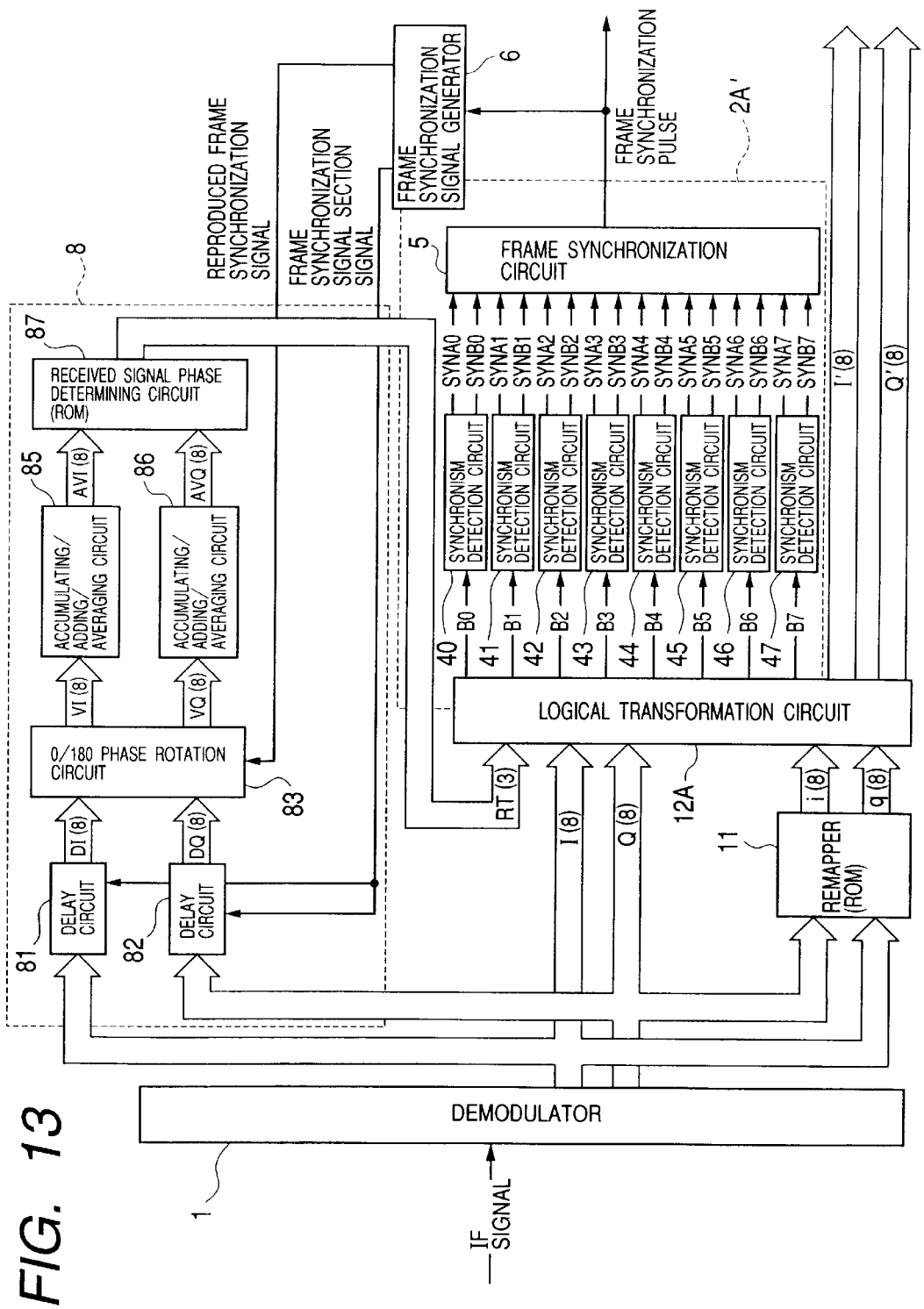
FIG. 13 is a block diagram showing the structure of the absolute-phasing synchronization capturing circuit according to the second embodiment of the invention.

Next, the absolute-phasing synchronization capturing circuit according to a third embodiment of the invention will be described. FIG. 13 is a block diagram showing the structure of the absolute-phasing synchronization capturing circuit according to the third embodiment of the invention.

In the absolute-phasing synchronization capturing circuit according to the third embodiment of the invention, a frame synchronization detection block 2A' is used in place of the frame synchronization detection block 2A of the absolute-phasing synchronization capturing circuit according to the first embodiment of the invention. The received signal phase detection block is the same as the conventional circuit.

The frame synchronization detection block 2A' uses the conventional synchronism detection circuits 40 to 47 in place of the synchronism detection circuits 40A to 43A. An MSB of an inverted I(8), an MSB of an inverted i(8), an MSB of an inverted Q(8) and an MSB of an inverted q(8) respectively indicated by broken lines in FIG. 6 are further extracted from the logical transformation circuit 12 shown in FIG. 6 to use them as the outputs B4, B5, B6 and B7 which are supplied to the synchronism detection circuits 40 to 47. Outputs SYNA0 to SYNA7 and SYNB0 to SYNB7 from the synchronism detection circuits 40 to 47 are supplied to the frame synchronization circuit 5.

The frame synchronization is detected in accordance with the BPSK demapping outputs B0 to B7 generated by the logical transformation circuit 12A. The BPSK demapper 3 used conventionally is not necessary, and only the logical transformation circuit 12A having a small and simple circuit is used. The circuit scale of the absolute-phasing synchronization capturing circuit can therefore be reduced.

As described so far, according to the absolute-phasing synchronization capturing circuit of this invention, the circuit scale can be reduced considerably, and the chip area of an IC which fabricates the absolute-phasing synchronization capturing circuit thereon can be used efficiently.

What is claimed is:

1. An absolute-phasing synchronization capturing circuit for absolute-phasing of making a reception signal phase angle coincide with a transmission signal phase angle, by capturing a frame synchronization signal and by detecting the reception signal phase rotation angle relative to the transmission signal phase angle from the captured frame synchronization signal, the circuit comprising:

phase rotating means for rotating phases of demodulated baseband signals by 45°×n (n=1, 3, 5, or 7);

first phase inverting means for inverting the phases of the demodulated baseband signals;

second phase inverting means for inverting phases of baseband signals phase-rotated by said phase rotating means; and selecting means for selectively outputting the demodulated baseband signals, the baseband signals phase-rotated by said phase rotating means, the baseband signals output from said first phase inverting means, and the baseband signals output from said second phase inverting means, in accordance with the reception signal phase rotation angle relative to the transmission signal phase, wherein predetermined bits are extracted from the demodulated baseband signals and the frame synchronization signal is captured by using the extracted predetermined bits.

2. The circuit according to claim 1, wherein the most significant bits are extracted from the demodulated baseband signals and from the baseband signals phase-rotated by said phase rotating means, and the frame synchronization signal is captured by using the extracted most significant bits.

3. The circuit according to claim 2, wherein the most significant bits are extracted from at least the baseband signals output from said first and second phase inverting means, and the frame synchronization signal is captured by using the extracted most significant bits.

4. An absolute-phasing synchronization capturing circuit for the absolute-phasing of making a reception signal phase angle coincide with a transmission signal phase angle, by capturing a frame synchronization signal and by detecting the reception signal phase rotation angle relative to the transmission signal phase angle from the captured frame synchronization signal, the circuit comprising:

a synchronism detection circuit for detecting a bit stream of a first frame synchronization signal alternately extracted from demodulated baseband signals, a bit stream of a second frame synchronization signal obtained by inverting the last half bits of the bit stream of the first frame synchronization signal, a bit stream of a third frame synchronization signal obtained by inverting each bit of the bit stream of the first synchronization signal, and a bit stream of a fourth frame synchronization signal obtained by inverting each bit of the bit stream of the second frame synchronization signal, wherein the frame synchronization signal is captured in accordance with an output from said synchronism detection circuit.

5. An absolute-phasing synchronization capturing circuit for absolute-phasing of making a reception signal phase angle coincide with a transmission signal phase angle, by capturing a frame synchronization signal and by detecting the reception signal phase angle relative to the transmission signal phase rotation angle from the captured frame synchronization signal, the circuit comprising:

accumulating/adding/subtracting/averaging means (e.g., 85A, 86A) for receiving data symbols (e.g., D1(8), DQ(8)) obtained by demodulating the frame synchronization signal that was modulated with BPSK, the accumulating/adding/subtractinq/averaging means being operable to detect data bits of a frame synchronization signal on the basis of the demodulated data symbols over a frame synchronization signal section, to perform an adding operation on the received data symbol if the detected data bit of the frame synchronization signal has a logical level "1", while performing a subtracting operation on the received data symbol if the detected data bit of the frame synchronization signal has a logical level "0", and to average adding/subtracting operation results, wherein a phase of a reception signal is determined in accordance with an output from said accumulating/adding/subtracting/averaging means, and phases of the demodulated baseband signals are rotated by an amount of the determined phase.

* * * * *